(12) United States Patent
Jagannatha et al.

(10) Patent No.: US 9,703,644 B1
(45) Date of Patent: Jul. 11, 2017

(54) METHODS FOR GENERATING A SYNTHETIC BACKUP AND FOR CONSOLIDATING A CHAIN OF BACKUPS INDEPENDENT OF ENDIANNESS

(71) Applicant: EMC Corporation, Hopkinton, MA (US)

(72) Inventors: Manjunath Jagannatha, Bangalore (IN); Kiran Kumar Madiraju Varadaraju, Bangalore (IN); Pavan Kumar Dattatreya Ati, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 49 days.

(21) Appl. No.: 14/564,971

(22) Filed: Dec. 9, 2014

(51) Int. Cl.
*G06F 11/14* (2006.01)
*G06F 13/40* (2006.01)

(52) U.S. Cl.
CPC ...... *G06F 11/1464* (2013.01); *G06F 11/1435* (2013.01); *G06F 11/1448* (2013.01); *G06F 11/1451* (2013.01); *G06F 13/4013* (2013.01)

(58) Field of Classification Search
CPC ............. G06F 11/1448; G06F 11/1451; G06F 13/4013; G06F 11/1464; G06F 14/1435
See application file for complete search history.

(56) References Cited

U.S. PATENT DOCUMENTS

| | | | | |
|---|---|---|---|---|
| 5,907,865 A * | 5/1999 | Moyer | ..................... | G06F 7/768 711/201 |
| 6,760,829 B2 * | 7/2004 | Lasserre | ................. | G06F 1/206 711/130 |
| 7,266,655 B1 * | 9/2007 | Escabi, II | ........... | G06F 11/1448 707/999.202 |
| 7,694,088 B1 * | 4/2010 | Bromley | ............. | G06F 11/1458 711/162 |
| 7,756,833 B2 * | 7/2010 | Van Ingen | .......... | G06F 11/1451 707/640 |
| 8,099,391 B1 * | 1/2012 | Monckton | ........... | G06F 11/1451 707/647 |
| 8,117,168 B1 * | 2/2012 | Stringham | .......... | G06F 11/1451 707/646 |
| 8,595,452 B1 * | 11/2013 | Katzer | .................. | G06F 3/0607 707/619 |
| 2006/0184561 A1 * | 8/2006 | Terada | ................... | G06F 17/303 |
| 2008/0172541 A1 * | 7/2008 | Park | ...................... | G06F 11/1441 711/170 |
| 2009/0073595 A1 * | 3/2009 | Park | ...................... | G11B 27/329 360/48 |
| 2011/0106768 A1 * | 5/2011 | Khanzode | ........... | G06F 11/1458 707/646 |

(Continued)

*Primary Examiner* — Mark Giardino, Jr.
*Assistant Examiner* — Glenn Gossage
(74) *Attorney, Agent, or Firm* — Workman Nydegger (57) ABSTRACT

Systems and methods for generating synthetic backups and for consolidating a chain of related backups. The chain of related backups is merged on the fly to create a backup stream. A block allocation table (BAT) may be identified for each backup to be consolidated into a synthetic backup, and BAT entries from each backup may be merged or combined to create a new BAT table associated with the synthetic backup. The data included in the related backups may be reformatted on the fly from big endian to little endian or vice versa. The backup stream is stored on a target device or volume.

14 Claims, 7 Drawing Sheets

(56) References Cited

U.S. PATENT DOCUMENTS

2013/0138613 A1\* 5/2013 Paulzagade ......... G06F 11/1458
707/647
2016/0070623 A1\* 3/2016 Derk ................... G06F 11/1469
714/6.23

\* cited by examiner

METHODS FOR GENERATING A SYNTHETIC BACKUP AND FOR CONSOLIDATING A CHAIN OF BACKUPS INDEPENDENT OF ENDIANNESS

FIELD OF THE INVENTION

Embodiments of the present invention generally relate to producing synthetic backups. More particularly, embodiments of the invention relate to systems and methods for consolidating save sets or backups independently of the endianness of the backups themselves.

BACKGROUND

Because data is integral and important in the lives of people and in the operations of businesses, it is necessary to protect the data from failure. This is often achieved by backing up the data. In many instances, the amount of data that requires protection can be quite large. The problem of protecting large amounts of data was solved, in one example, using incremental backups. Once a full backup has been established, it no longer necessary to continually generate additional full backups every time a backup is generated. The backup process can be improved by generating incremental backups that can be combined if necessary to reproduce the data.

At the same time, it becomes more difficult to manage the backups as the number of incremental backups increase over time. Performance of the backup application may suffer in this circumstance. In addition, there may be limits on the number of incremental backups that are dependent on the system resources.

This problem is partially solved by generating synthetic backups. A synthetic backup is not generated per se from the actual data, but is generated by combining some of the backups. In effect, this allows a new full backup to be generated. This can reduce the number of backups and can simplify management of the backups.

Unfortunately, synthetic backups are often affected by various factors such as the operating system, the machines, and the way in which the data is stored. Some systems store data in big endian format and other systems store data in little endian format. This can complicate the versatility of the backups or save sets and can complicate the ability to restore a save set in a given computing environment.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention generally relate to systems and methods for performing data protection operations such as backup operations or restore operations. More specifically, embodiments of the invention relate to systems and methods for consolidating save sets. In other words, embodiments of the invention further relate to generating synthetic backups from related save sets or related backups.

A save set, in one example, is a set of data or files that collectively represent a backup of a source (e.g., a server, a storage device, a volume, a disk, data or set thereof, or the like or combination thereon). In one example, the source may be a block device.

A backup application can create both full and incremental backups of a volume or other source. The full backup may be associated with a save set or a backup and each incremental backup is associated with a save set. As a result, the save sets or backups associated with a volume can be linked or form a chain of related backups. A full backup is created by copying all of the blocks of the volume to a target and an incremental backup is created by copying only the blocks that have changed since the most recent backup to a target. Often, these targets may be separate.

Embodiments of the invention may include virtualized components. Data may be stored or backed up in a virtual format. The full backups and the incremental backups of a volume, for example, may be stored as virtual disks (e.g., in a VHDx (Hyper-V Virtual Hard Disk) format). In one example, a virtual format is a container that can be mounted as a virtual disk. One of skill in the art can appreciate that embodiments may be adapted to other virtual formats and/or non-virtual formats. Embodiments further relate to providing data protection operations (e.g., backup operations and/or restore operations) for both virtual and/or non-virtualized sources.

The way in which a backup is stored (e.g., big endian or little endian) may depend on the configuration of the machines and/or operating systems involved in the backup operation. For example, a backup server may be either big endian or little endian and can generate backups in connection with storage nodes that are either big endian or little endian. However, this can create problems when generating a synthetic backup such as excessive bandwidth consumption and large processing requirements.

Embodiments of the invention account for the endianness of the underlying computing environment or backup and generate backups that are independent of the endianness. Embodiments of the invention can generate a synthetic backup by merging related backups in a stream context. The merge can be independent of both operating systems and system calls. During the merge, data can be converted from big endian to little endian or vice versa on the fly while generating the stream. As a result, embodiments of the invention can achieve synthetic full backups irrespective of the platform and/or the operating system and that are independent of the endianness of the machines.

In one example, backup data may be stored in a virtual format such as VHDx. By creating an empty VHDx, the backup stream can be streamed to and stored in the VHDx as a synthetic backup. The VHDx (or other format) is portable and can be restored in multiple different computing environments and operating systems. Advantageously, the synthetic backup is therefore independent of the endianness. The backups from which the synthetic backup is generated may also be virtual in nature.

In one embodiment during a full back up of data, a virtual disk containing the used blocks of a block device or other storage device is created and the full backup is stored as a virtual hard drive that can be mounted as a virtual disk. When an incremental backup is performed, the changed blocks (e.g., the blocks that have changed since the full backup operation) are stored as a differencing disk (child disk) of the initial virtual hard disk. Subsequent incremental backups are also stored as differencing disks (in the same format as the full backup in one example).

When generating a synthetic full backup, all incremental backups from a selected incremental backup (which may be the latest incremental backup) to the previous full backup are merged to create a full synthetic backup. These backups are consolidated into a full synthetic backup. Generating the full synthetic backup may include merging Block Allocation Table entries (BAT entries) and by merging data blocks of each of the backups where appropriate.

In one example, these backups are merged on the fly by generating a backup stream that contains the merged data in a sequential manner. The BAT entries can be processed sequentially and combined as appropriate. The blocks can be similarly merged. Where necessary, the endianness is converted to the endianness of the target volume.

The resulting backup stream can be streamed to any backup media. By merging the backups as the backup stream is generated, data that has a particular endianness can be reformatted to have a different endianness. This is achieved independently of the operating system and ensures that the data can be stored in a recognizable format.

When generating the backup stream, an empty virtual disk drive (e.g., VHDx) may be created to receive the synthetic backup. More specifically, data is read at the block level from a source volume or from source volumes, merged, and written to the VHDx created on a target location. In accordance with the VHDx standard, all multi-byte values will be stored in little endian format with the least significant byte first. This may affect the BAT entries of the VHDx. When the source of the data is in big endian format, the data is converted to little endian format in this example.

In one example, the BAT is used for translating virtual hard disk offset to the virtual hard disk file offset. It is a region listed in the region table of the VHDx that includes a single contiguous array of entries that specify the state and the physical file offset for each block. The BAT may be represented by a single array of 64-bit values in one example, with an entry for each block that determines the state and file offset of that block. The size of the block may vary.

The entries for the payload block and sector bitmap block are interleaved in a way that the sector bitmap block entry associated with a chunk follows the entries for the payload blocks in that chunk. Depending on the endianness of the machine (e.g., the storage node on which the backup or backups are associated or stored), the BAT entry is converted. In case of little endian machines and when using a target that has little endianness (like a VHDx file), the BAT entries can be directly manipulated as the order in which it is read is the same as the endianness of the machine. However, on Big endian machines, the endianness of the BAT may be changed before manipulation and the data is read and/or manipulated to be in little endianness format. Thus the synthetic backup can be recovered later on any machine irrespective of the architecture. In this manner, the synthetic backups and methods for consolidating save sets discussed herein achieve endianness independence.

Embodiments of the invention can generate full synthetic backups based on existing full and incremental backups. Embodiments may operate on the storage or on the media server. Processing may be performed at a client node in one example. In addition to generating a synthetic backup, the existing full and incremental block based volume backups are preserved. In one example, the merge operation of existing full and incremental volume backups is performed "on the fly" and can be streamed to any backup media such as a tape or disk or other appropriate storage.

Advantageously, block level volume restores can be done from the synthesized full backup. In addition, individual file level restores can be done from the synthesized backup. Also, a clone or stage to a different target can be performed from the synthesized backup.

Figure 1:
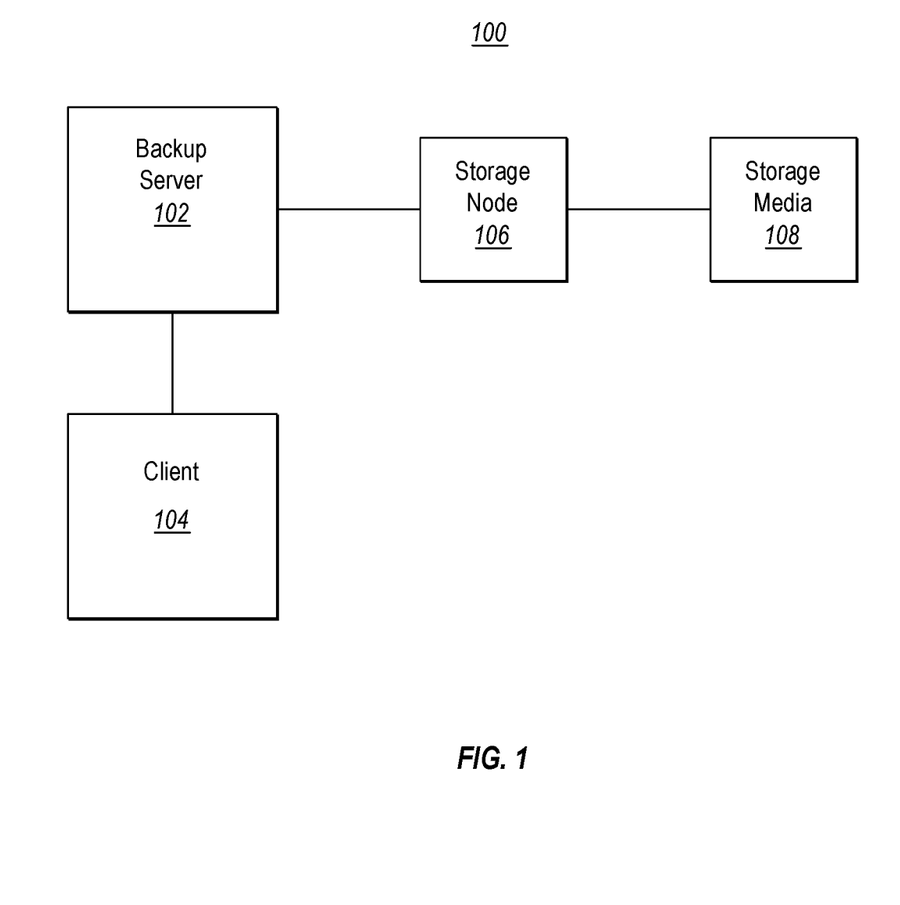
FIG. 1 illustrates an example of a backup system implemented in a computing environment that includes machines configured to perform data protection operations including generating a synthetic backup.

FIG. 1 is a block diagram illustrating an example backup system implemented in a computing environment 100. The backup system may include a backup server 102, a client 104, a storage node 106, and storage media 108. The storage node 106 can be on the same machine as the backup server 102 or the client 104, or on a separate machine. In one example, the endianness of each of these machines may be different. Embodiments of the invention generate a synthetic full backup that is independent of the endianness of the architecture of the various elements involved in a backup solution. In one example, related backups (e.g., a full backup and one or more incremental backups) are merged on the fly and the endianness is converted as necessary as the synthetic backup is streamed to a target location in a predetermined format. Converting the BAT may include adjusting the offset and/or reordering the bytes of the data.

Figure 2:
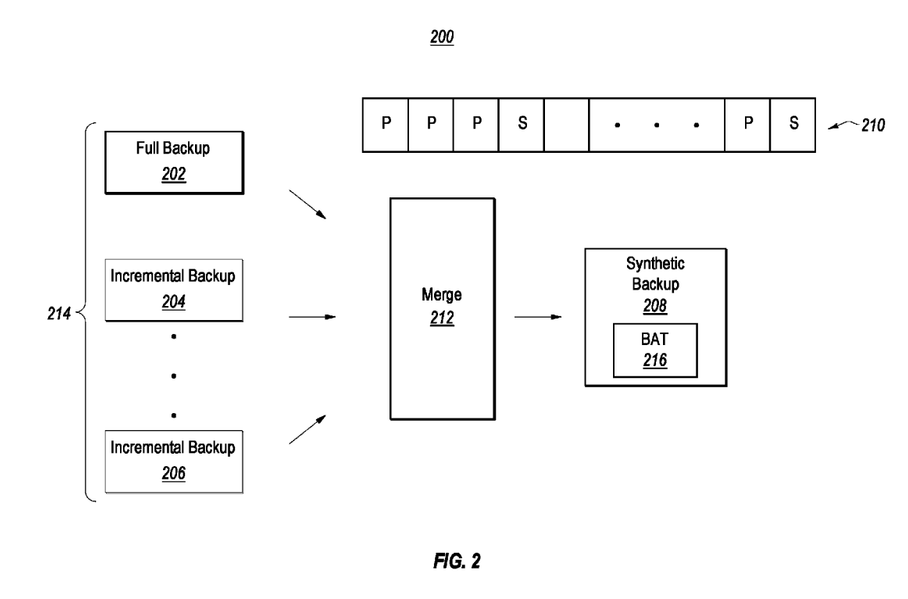
FIG. 2 illustrates an example of generating a synthetic backup from a chain of related backups or save sets.

FIG. 2 is a block diagram 200 illustrating an example of generating a synthetic backup from other backups or save sets. FIG. 2 illustrates a full backup 202 and incremental backups 204 and 206. The backups 202, 204 and 206 are related to the same data and each of the backups 202, 204, and 206 is an example of a save set. The backup 202, for example, may include all files and metadata necessary to restore the backup 202. The incremental backups 204 and 206 include all files and metadata necessary to restore the incremental backups. The backups 202, 204, and 206 may each be stored in a virtual file format such as VHDx or in a non-virtual format.

Each of the backups 214 is associated with its own block allocation table (BAT) and an example of a BAT is illustrated as BAT 210. The BAT 210 is used to translate a virtual hard disk offset to a virtual hard disk file offset in one example. The BAT 210 may include entries that specify the state and physical file offset for each block. The BAT 210 includes payload entries (P) and sector bitmap entries (S) that are interleaved in one example.

The merge 212 includes merging the data associated with the blocks of the backups 214 and the BATs associated with the backups 214. When the backups 214 are merged in merge 212, data zones can be identified. In one example, a data zone may include blocks that need to be merged for each of the entries in the BATs. The granularity of the merge (e.g., the block size) can vary. In some examples, the granularity may be from 1 Mb to 256 MB. Other block sizes are within the scope of the invention as well. In one example, the blocks associated or identified in the backups are processed sequentially one at a time. If the blocks are big endian, they may be converted to little endian or vice versa and the corresponding BAT entries are also manipulated. Little endian backups may remain in little endian format in one example.

When merging the backups 214 in merge 212, a new BAT 216 associated with the synthetic backup 208 is generated. The BAT 216 is prepared by inspecting the BAT entries of the backups 214. If there is a BAT entry that contains a non-zero offset, then the payload block to which the entry corresponds needs to be merged.

Figure 3:
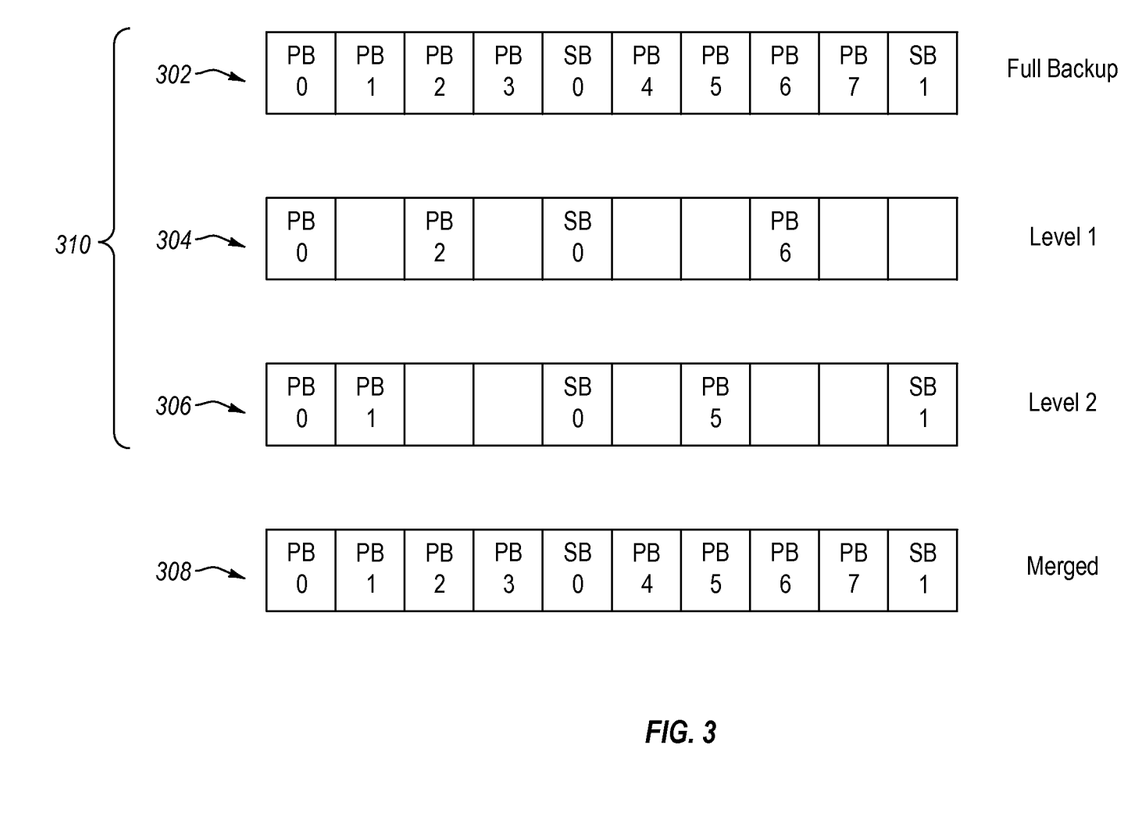
FIG. 3 illustrates an example of Block Allocation Tables (BAT) associated with specific backups that are merged into a new BAT table and an example of merging extents associated with the backups.

FIG. 3 illustrates an example of BAT tables. FIG. 3 illustrate a BAT 302 associated with a full backup, a BAT 304 associated with a first incremental backup (level 1), a BAT 306 associated with a second incremental backup (level 2) and a merged or new BAT 308 that is associated with a synthetic backup. The BAT 308 is generated by combining or merging the BATs 310.

The entries in the BATs shown in FIG. 3 can identify information associated with the corresponding backups (which may be stored as virtual disks as previously stated). The BAT 302, for example, corresponds to a full backup. Consequently, all payload blocks (identified by PB entry) are occupied. The BAT 304 is associated with an incremental backup as previously stated and only some of the entries are occupied in one example. Other entries that are associated with blocks that have not changed may have a zero value. Stated differently, there is less data associated with the BAT 304 than the BAT 302. Similarly, only some of the entries in the BAT 306 are occupied.

The entries in new BAT 308 are generated by merging the entries of the BATs 310. Also, the associated data may also be merged. For example, merged extents with a common payload block may identified by (start, length, id) in the BATs 310. The id identifies which backup is associated with blocks (0 is the full backup 202, 1 is the incremental backup 204, and 2 is the incremental backup 206) in the new BAT 308. As illustrated in FIG. 3, the PB 0 entry in the BAT 308 may be generated as follows (0, 1K, 1), (4K, 2K, 2), (6K, 2K, 1), (8K, 2042K, 0). The first parameter of each entry identifies the start locations within the block or an offset, the second parameter of each entry identifies a length of the payload, and the third parameter in each entry identifies the backup (e.g., 0 for the full backup 202, 1 for the incremental backup 204, and 2 for the incremental backup 206). These entries come from the PB 0 entries of the BATs 310. The entry in the BAT 308 (the new merged BAT) thus identifies the extents that need to be merged from the backups and thus identifies the merged data.

The extents can then be combined on the fly. In one example, when the backup stream is generated, the extents are converted to little endian format for VHDx or to the format appropriate for a given storage format as necessary. Thus, the array of BATs 310 can be used to prepare the stream extents included in the backup stream by identifying extents in the corresponding backups to be merged.

The other entries in the BAT 308 may be similarly configured and identify the blocks in the synthetic backup. Some entries of the BAT 308 will substantially match the BAT 302 because there was no corresponding entry in the BATs 304 and 306. The extents belonging to the backups 310 can thus be merged and associated with the BAT 308 in a synthetic backup. During the merge, the endianness is changed when necessary on the fly. The BAT 308 illustrates the merged distributed stream extents of a full backup and its associated incremental backups.

In one example, the block size may be 2 megabyte (MB) (blocks can be implemented with other sizes) and all blocks in the backup are full (e.g., (0, 2048 k)) in one example. The entries in the BAT 306 may be as follows: PB0 (0,1 k), (4 k,8 k); PB2 (16 k, 32 k); PB6 (256 k, 16 k). The entries in the BAT 306 may be as follows: PB0 (4 k,2 k), PB1 (20 k, 4 k), PB5 (128 k, 4 k).

In this example, all entries except PB3 and PB4 need to be merged. The merged entries in the BAT 308 may be as follows and are an example of a merged index array:

PB0=(0,4 k,1), (4 k,2 k,2), (6 k,2 k,1), (8 k,2042 k,0)
PB1=(0,20 k,0), (20 k, 4 k,2), (24 k, 2024 k, 0)
PB2=(0,16 k,0), (16 k,32 k,1), (48 k, 2000 k, 0)
PB3=(0,2048 k,0)
PB4=(0,2048 k,0)
PB5=(0, 128 k,0), (128 k,4 k,2), (132 k,1916 k,0)
PB6=(0,256 k,0), (256 k, 16 k,1), (272 k,1776 k,0)
PB7=Empty These indexes illustrate and identify which backup the data comes from for the merged data and identifies the offsets as well. In one example, these indexes may identify the locations from which data is pulled.

In this manner, the BATs 310 may be merged into the new BAT 308. This process is performed on the fly in one example. As previously stated, the format of the backups 214 may be converted to little endian format (or big endian format) if necessary or to an appropriate format.

Figure 4:
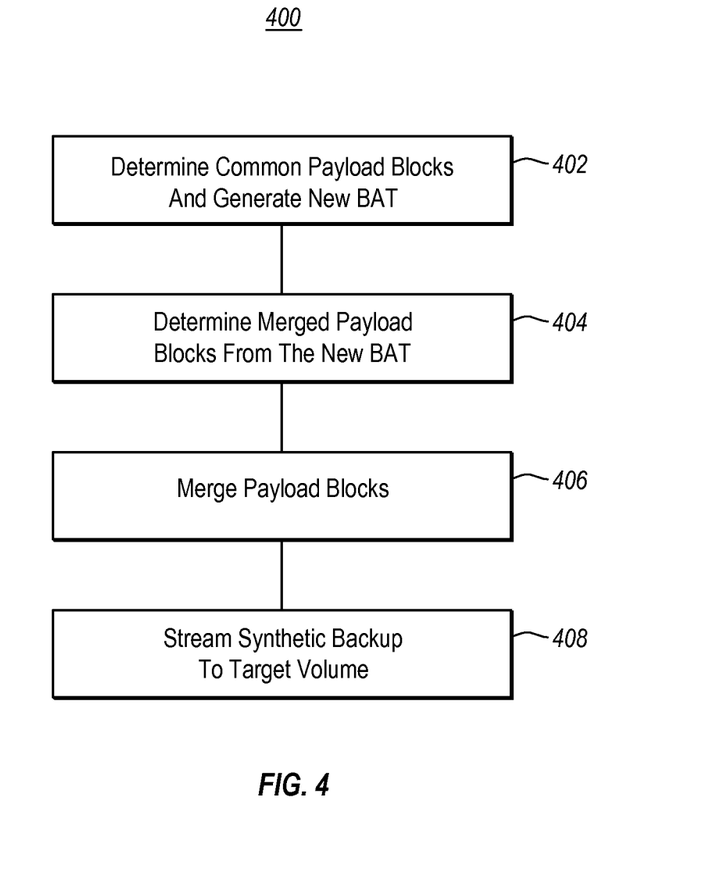
FIG. 4 illustrates an example of a method for generating a backup stream that is streamed to a target volume as a synthetic backup.

FIG. 4 illustrates a method 400 for generating a synthetic backup from a backup chain (e.g., a full backup plus one or more incremental backups). The method 400 begins by determining common payload blocks and generating a new BAT in block 402. With reference to FIG. 3, the blocks PB0 identify common payload blocks in the backups. A single pass is performed to generate a single target stream which contains the merged data of the full and incremental backups (blocks) in a sequential manner. In one example, the PB0 blocks of the backups are examined and processed. Then the PB1 blocks are examined and processed. This continues until all entries in the BAT tables have been evaluated. The merged blocks can be included in the backup stream.

In one example, a VHDx is described in terms of payload blocks and this example determines common payload blocks and generates a new BAT for a VHDx. The new BAT identifies extents to be merged from the backups. The common payload blocks can be determined and the new BAT generated.

In block 404, the merged payload blocks are determined from the new BAT. The generation of the new or merged BAT may be performed prior to or when the common blocks are determined. The merged payload blocks are determined block by block from the new BAT table. Next, the payload blocks are merged in block 406 to create a distributed extent backup stream and the stream is streamed as a synthetic backup to a target volume in block 408. When merging the payload blocks in block 406, backups stored in big endian format are changed to little endian format when the target volume for the synthetic backup is associated with little endian format. Because the conversion occurs on the fly, the change is independent of the operating system and machines that generated the backup.

Figure 5:
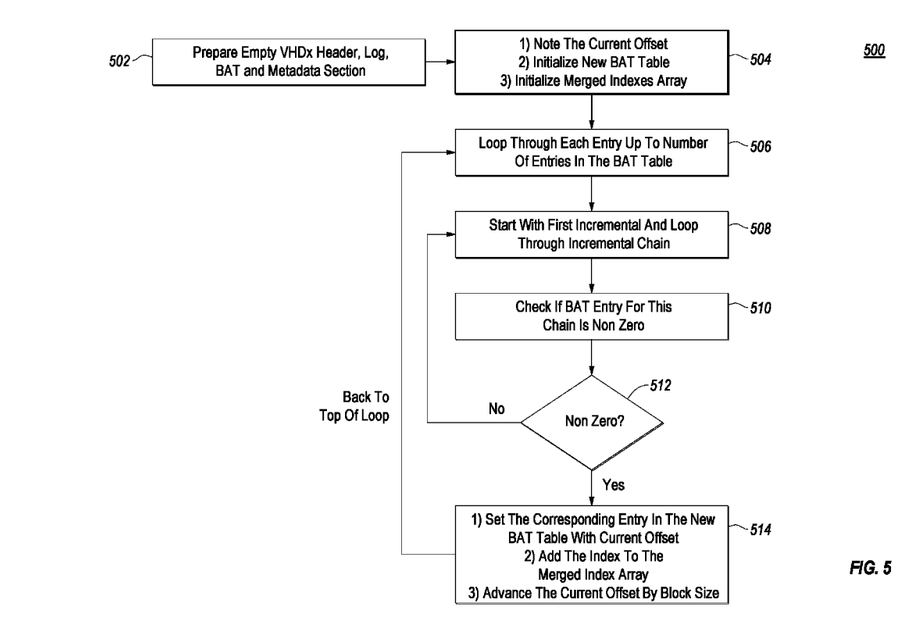
FIG. 5 is an example of a method for determining common payload blocks and generating a new BAT.
Figure 6:
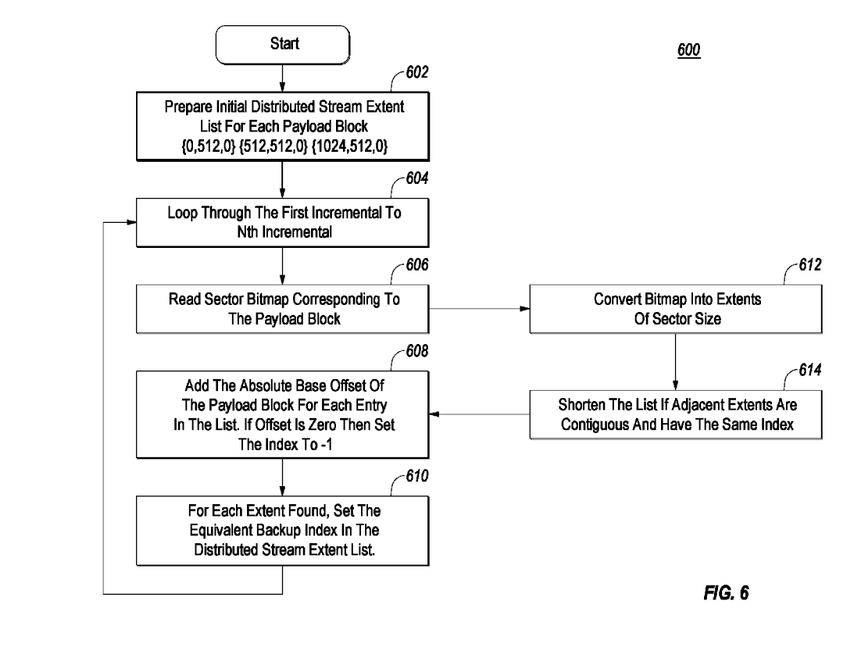
FIG. 6 is an example of a method for determining merged payload blocks.
Figure 7:
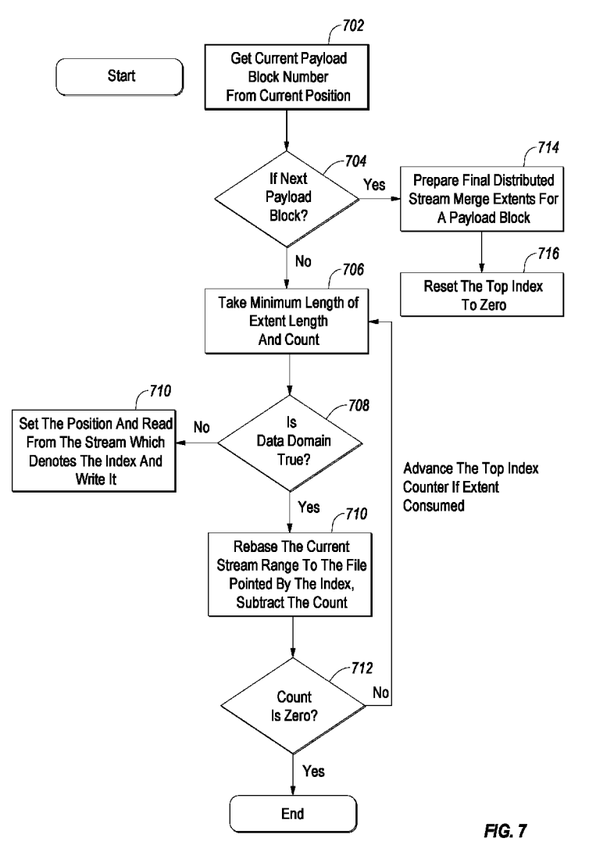
FIG. 7 is an example of a method for merging payload blocks in a backup stream.

FIGS. 5-7 illustrates elements of FIG. 4 with more detail. FIG. 5 illustrates an example of determining common payload blocks and generating a new BAT. The new merged BAT contains offsets relative to a new target file as discussed previously, which will be eventually streamed to the new synthesized file once the backup stream is streamed out to the target. The new merged BAT table is prepared by inspecting the BAT entries of each of the backups starting from full backup to N−1 incremental chain. If there is a BAT entry that contains a non-zero offset that means the payload block which the index corresponds to needs to be merged. An example of this process is illustrated in FIG. 5.

In block 502, the backup stream (e.g. the VHDx stream) is prepared. In block 504, the current offset is noted, the new BAT table is initialized, and the merged indexes array is initialized. In block 506, the method 500 loops through each entry up to the number of entries in the BAT table.

In block 508, the method 500 starts with the first incremental backup and loops through the incremental chain. In block 510, the BAT entry is checked to see if the entry is non-zero. If the entry is non-zero in block 512, then the corresponding entry in the new BAT table is set with the current offset, the index is added to the merged index array, and the current offset is offset by the block size.

As previously discussed, this can result in a new BAT array whose corresponding entries can identify the offset for the data included in the block.

In one example, an array of file descriptors is pulled from the entries in the BAT tables as previously described. As previously discussed, the array of file descriptors (start, length, id) is generated and identifies the distributed stream extents that will be included in the backup stream.

Once the merged or new BAT table is generated, in one example, the merged payload blocks are determined block by block from the merged or new BAT table. FIG. 6 is an example of a method for determining the merged payload blocks from the new BAT table. In block 602, the initial distributed stream extent array is prepared for each payload block. In one example, the offsets point to the base full backup i.e. (0,512, 0), (512,512,0), (1024,512,0) up to (2 MB-512, 512, 0).

In block 604, the method 600 loops through the first incremental backup to the Nth incremental backup. This includes reading the sector bitmap corresponding to the payload block in block 606. This may include obtaining the corresponding stream object and BAT table. The sector bitmap offset is identified and the sector bitmap is fully read. In box, 612, the bitmap is converted into extents of sector size (e.g., 512k).

The extent from the array in block 602 is obtained and the id is changed to point to that stream.

In block 614, the list of adjacent extents are shortened if they are contiguous and have the same index. In block 608, the absolute base offset of the payload block is added for each of the entries in the list. If the offset is zero, the index is set to −1 so that zeros are filled for that range. Sometimes the sub range within a payload block cannot be found in any of the incremental backup chains so it will be pointing to the full backup. Thus, the range is set to zero. This avoids seek and read to the base file. It also increases the speed and the de-duplication performance.

In block 610, for each extent found, the equivalent backup index is set in the distributed stream extent list.

FIG. 7 is an example of a method for reading and merging the payload blocks in a backup system. In block 702, the current payload block number is obtained from the current position. If there is a next payload block, then the final distributed stream merge extents for a payload block are prepared in block 714 and the top index is reset to zero in block 716. In one example, the bytes to read are set to the payload block size and the target fill position is obtained. Then, the extents are read and collected until the entire payload block is merged.

When looping, the minimum length of the extent length and count are taken in block 706. In block 708 if data domain is true, then the current stream range is rebased to the file pointed by the index and the count is subtracted in block 712 and the process is looped. When data domain (DD) is false in block 708, the position is set and read from the stream which denotes the index and is written in block 710.

Stated differently, the following steps are repeated until the whole payload block is written and the process then proceeds to the next payload block.

Initially, take minimum of extent length and bytes to read. Then, get extent index to the stream to which it belongs in the incremental chain and get the corresponding stream object from the stream table array. Next, set the stream position and read the minimum length fully. Write it to the target position and advance by the minimum of the extent length. Add the extent start offset, decrement the extent length, and the bytes read. If extent length is zero, then move the top index to the next distributed stream extent.

In the context of data domain and when merging payload blocks, steps include: set bytes to read to payload block size, get the target file position, loop until the entire payload block is merged, and get the top index extent from the final merged array generated for this payload block zone. Next, take minimum of extent length and bytes to read, get extent index to which stream it belongs in the incremental chain, get the corresponding stream object from the stream table array, set the data domain extent to current extent start and length and call a synthesize interface. Then, advance the target position, add the extent start offset, decrement the extent length, and decrement the bytes read. If extent length is zero, then move the top index to the next distributed stream extent.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), random access memory (RAM), read only memory (ROM), electrically erasable programmable read only memory (EEPROM), compact disc-read only memory (CD-ROM), flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a synthetic backup from a chain of related backups, the method comprising:
   merging BAT (Block Allocation Table) entries from each backup in the chain of related backups into a new BAT associated with the synthetic backup;
   determining payload blocks from the chain of related backups to be merged from the new BAT;
   generating a backup stream that is stored as the synthetic backup in a target volume; and
   while generating the backup stream, merging the payload blocks in accordance with index data included in corresponding block entries from the new BAT, wherein a format of the payload blocks is changed from a first format to a second format associated with the target volume.

2. The method of claim 1, wherein the first format is big endian and the second format is little endian or wherein the first format is little endian and the second format is big endian.

3. The method of claim 1, wherein the backup stream is a Hyper-V Virtual Hard Drive (VHDx) stream.

4. The method of claim 1, wherein the format is changed from the first format to the second format on the fly.

5. The method of claim 1, wherein the change from the first format to the second format is independent of a format associated with an operating system of a machine on which the chain of related backups is stored.

6. The method of claim 1, wherein entries in the new BAT include an index array, wherein each index in the index array identifies a start, a length, and an id that identifies one of the backups in the chain of backups.

7. A method for consolidating a chain of related backups that include a full backup and one or more incremental backups, the method comprising:
   identifying a Block Allocation Table (BAT) for each backup in the chain of related backups to be consolidated into a synthetic backup;
   combining entries in the BATs to create a new BAT, wherein the new BAT identifies data from the chain of related backups that is to be merged;
   looping through the entries in the new BAT, wherein each entry is associated with a backup block and wherein data identified in the entries is merged while creating a backup stream that includes the new BAT and the merged data; and
   streaming the backup stream to a target.

8. The method of claim 7, further comprising changing entries in the BATs associated with a first format such that the BAT entries are associated with a second format.

9. The method of claim 8 wherein the BAT entries are converted based on their endianness.

10. The method of claim 8, further comprising changing data in the first format to the second format.

11. The method of claim 7, wherein non-zero entries in the new BAT are filled with zeros.

12. The method of claim 7, further comprising reading data from each block of the backups identified in the new BAT and writing the read data to the target.

13. The method of claim 12, wherein the target is a virtual target that can be mounted as a virtual disk.

14. The method of claim 7, wherein an image of the backup can be recovered on any machine regardless of an endianness of the machine.

* * * * *